(12) United States Patent
Gajic et al.

(10) Patent No.: US 12,720,366 B2
(45) Date of Patent: Aug. 25, 2026

(54) ENERGY TYPE AWARE CONTROL MECHANISM FOR COMMUNICATION NETWORK

(71) Applicant: Nokia Solutions and Networks Oy, Espoo (FI)

(72) Inventors: Borislava Gajic, Munich (DE); Péter Szilágyi, Budapest (HU)

(73) Assignee: Nokia Solutions and Networks, Espoo (FI)

(*) Notice: Subject to any disclaimer, the term of this patent is extended or adjusted under 35 U.S.C. 154(b) by 275 days.

(21) Appl. No.: 18/595,823

(22) Filed: Mar. 5, 2024

(65) Prior Publication Data

US 2024/0381179 A1 Nov. 14, 2024

(51) Int. Cl.

*H04W 28/08* (2023.01)
*H04W 24/02* (2009.01)
*H04W 28/02* (2009.01)

(52) U.S. Cl.

CPC ....... *H04W 28/0917* (2020.05); *H04W 24/02* (2013.01); *H04W 28/0263* (2013.01)

(58) Field of Classification Search

CPC ............. H04W 28/0917; H04W 24/02; H04W 28/0263; H04W 52/0258; H04L 43/08; H04L 41/5009; Y02D 30/70

See application file for complete search history.

(56) References Cited

U.S. PATENT DOCUMENTS 7,953,519 B2 5/2011 Hamilton, II et al.
2012/0252525 A1 10/2012 Frenger
2017/0013561 A1* 1/2017 Soldati .............. H04W 52/0216
2022/0299963 A1 9/2022 Waghmare et al.
2023/0247548 A1* 8/2023 Qiao ................ H04W 52/0219 370/311

(Continued)

FOREIGN PATENT DOCUMENTS

CN 104093198 B 8/2017
WO 2020236047 A1 11/2020
WO 2021/229587 A1 11/2021

OTHER PUBLICATIONS

WO_2023179890_A1 (Year: 2023).*

(Continued)

*Primary Examiner* — Rushil P. Sampat
(74) *Attorney, Agent, or Firm* — Lippes Mathias LLP

(57) ABSTRACT

An apparatus for use by a communication network control element or communication network control function acting as an operation and maintenance entity of a communication network, the apparatus including at least one processing circuitry, and at least one memory for storing instructions that, when executed by the at least one processing circuitry, cause the apparatus at least: to obtain energy type data related to an energy supply of at least a part of the communication network, to conduct a first mapping process of mapping the obtained energy type data to at least one network element or network function of the communication network or to at least one communication operation conducted in the communication network, and to process a result of the first mapping process for conducting a report operation or network optimization operation based on the energy type data.

15 Claims, 8 Drawing Sheets

(56) References Cited

U.S. PATENT DOCUMENTS

| | | | | |
|---|---|---|---|---|
| 2023/0284133 | A1* | 9/2023 | Luo | H04L 12/12 370/329 |
| 2024/0187991 | A1* | 6/2024 | Rydén | H04W 24/10 |
| 2025/0202787 | A1* | 6/2025 | Pateromichelakis | H04L 43/08 |
| 2025/0254016 | A1* | 8/2025 | Wang | H04W 16/04 |
| 2025/0300897 | A1* | 9/2025 | Pateromichelakis | H04L 41/0833 |
| 2025/0317849 | A1* | 10/2025 | Magnouche | H04W 52/0206 |

OTHER PUBLICATIONS

WO_2024132124_A1 (Year: 2024).*

Extended European Search Report dated Jul. 23, 2024 corresponding to European Patent Application No. 24158519.9.

MediaTek Inc., "A new use case on supporting carbon-aware communication service," 3GPP Draft; S1-230283, 3GPP TSG-SA WG1 Meeting #101, Athens, Greece, Feb. 20-24, 2023, Feb. 10, 2023, XP052237007.

3GPP TR 22.882 V0.3.0 (Feb. 2023), Technical Report, 3rd Generation Partnership Project; Technical Specification Group Tsg Sa; Study on Energy Efficiency as service criteria (Release 19), Mar. 31, 2023, XP052284103.

Sriram Prasanth T et al., "A survey on techniques related to Base Station Sleeping in Green communication and CoMP analysis," 2nd IEEE International Conference on Engineering and Technology (ICETECH), Mar. 17, 2016, pp. 1059-1067, XP032962321.

Abu Jahid et al., "Techno-Economic and Energy Efficiency Analysis of Optimal Power Supply Solutions for Green Cellular Base Stations," IEEE Access, IEEE, vol. 8, Feb. 9, 2020, pp. 43776-43795, XP011777534.

"3rd Generation Partnership Project; Technical Specification Group Services and System Aspects; Management and orchestration; Energy efficiency of 5G (Release 18)", 3GPP TS 28.310, V18.1.0, Mar. 2023, pp. 1-37.

"3rd Generation Partnership Project; Technical Specification Group Services and System Aspects; Management and orchestration; 5G end to end Key Performance Indicators (KPI) (Release 18)", 3GPP TS 28.554, V18.1.0, Mar. 2023, pp. 1-49.

"3rd Generation Partnership Project; Technical Specification Group Services and System Aspects; Management and orchestration; 5G performance measurements (Release 18)", 3GPP TS 28.552, V18.2.0, Mar. 2023, pp. 1-327.

"3rd Generation Partnership Project; Technical Specification Group Services and System Aspects; Management and orchestration; Management Data Analytics (MDA) (Release 17)", 3GPP TS 28.104, V17.3.0, Mar. 2023, pp. 1-87.

"3rd Generation Partnership Project; Technical Specification Group Services and System Aspects; Study on new aspects of Energy Efficiency (EE) for 5G Phase 2 (Release 18)", 3GPP TR 28.913, V0.5.0, Mar. 2023, pp. 1-28.

"3rd Generation Partnership Project; Technical Specification Group TSG SA; Study on Energy Efficiency as service criteria (Release 19)", 3GPP TR 22.882, V1.0.0, Mar. 2023, pp. 1-27.

"3rd Generation Partnership Project; Technical Specification Group Services and System Aspects; Management and orchestration; 5G Network Resource Model (NRM); Stage 2 and stage 3 (Release 18)", 3GPP TS 28.541, V18.3.0, Mar. 2023, 588 pages.

"Msc-generator", Sourceforge, Retrieved on Feb. 28, 2024, Webpage available at :https://sourceforge.net/projects/msc-generator/.

"3rd Generation Partnership Project; Technical Specification Group Services and System Aspects; Architecture enhancements for 5G System (5GS) to support network data analytics services (Release 18)", 3GPP TS 23.288, V18.1.0, Mar. 2023, pp. 1-286.

"3rd Generation Partnership Project; Technical Specification Group Services and System Aspects; Telecommunication management; Performance Management (PM) for mobile networks that include virtualized network functions; Stage 2 (Release 17)", 3GPP TS 28.522, V17.0.0, Mar. 2022, pp. 1-7.

Search Report received for corresponding United Kingdom Patent Application No. 2306967.7, dated Nov. 9, 2023, 9 pages.

Examination Report under Section 18(3) dated Jun. 24, 2025, in corresponding GB Patent Application No. GB2306967.7.

* cited by examiner

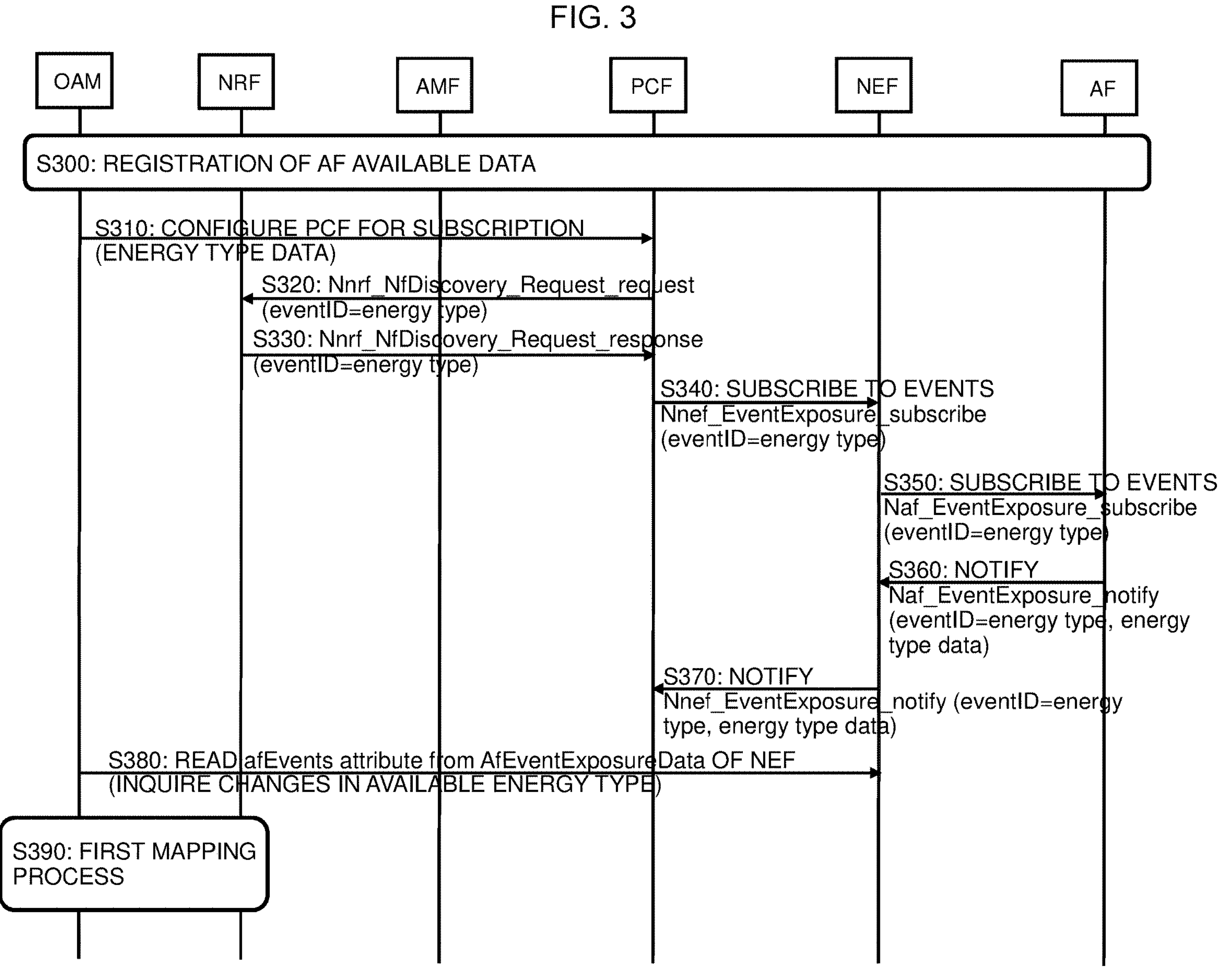
FIG. 3
OAM
NRF
AMF
PCF
NEF
AF
S300: REGISTRATION OF AF AVAILABLE DATA
S310: CONFIGURE PCF FOR SUBSCRIPTION (ENERGY TYPE DATA)
S320: Nnrf_NfDiscovery_Request_request (eventID=energy type)
S330: Nnrf_NfDiscovery_Request_response (eventID=energy type)
S340: SUBSCRIBE TO EVENTS Nnef_EventExposure_subscribe (eventID=energy type)
S350: SUBSCRIBE TO EVENTS Naf_EventExposure_subscribe (eventID=energy type)
S360: NOTIFY Naf_EventExposure_notify (eventID=energy type, energy type data)
S370: NOTIFY Nnef_EventExposure_notify (eventID=energy type, energy type data)
S380: READ afEvents attribute from AfEventExposureData OF NEF (INQUIRE CHANGES IN AVAILABLE ENERGY TYPE)
S390: FIRST MAPPING PROCESS

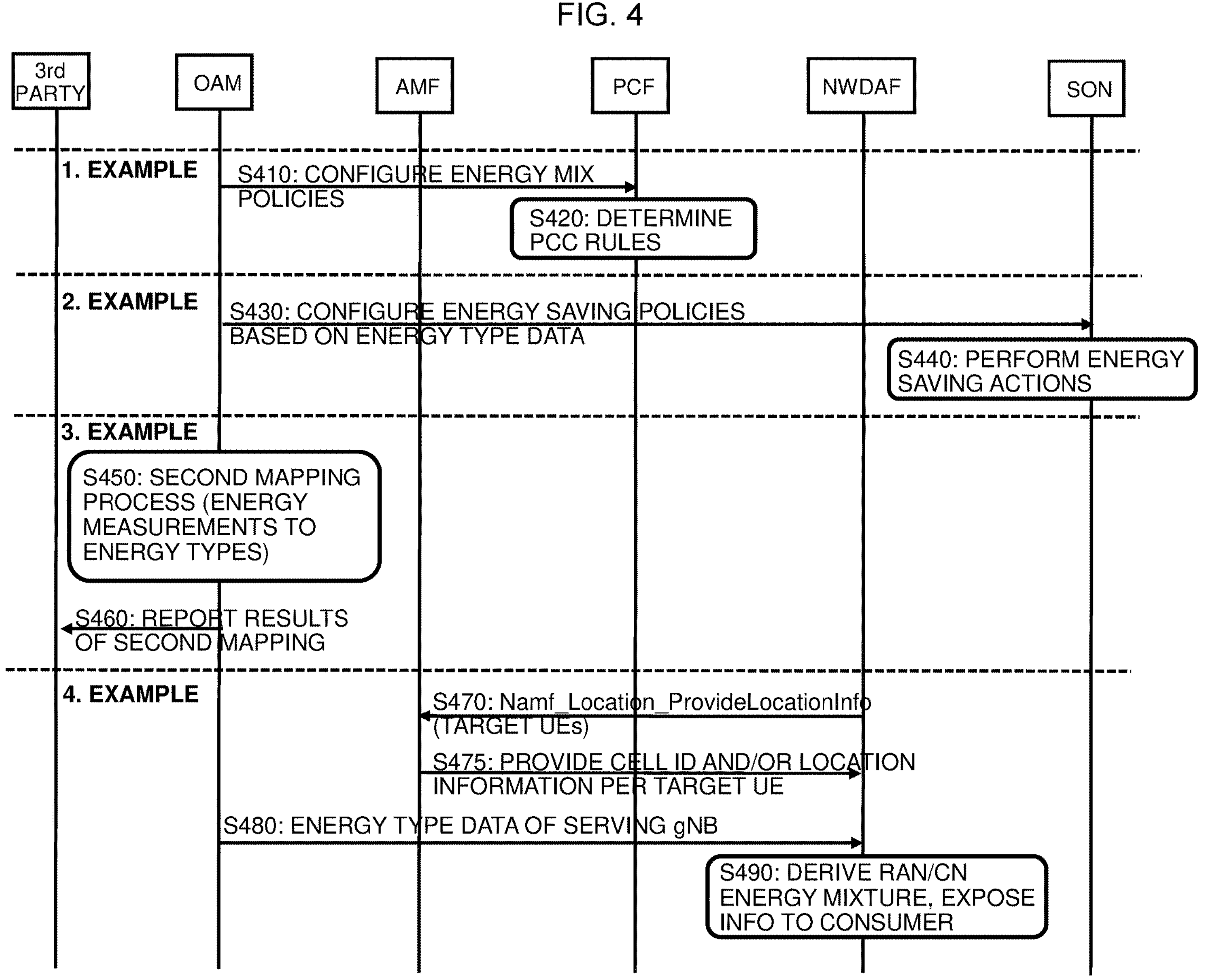

FIG. 4
3rd PARTY
OAM
AMF
PCF
NWDAF
SON
1. EXAMPLE
S410: CONFIGURE ENERGY MIX POLICIES
S420: DETERMINE PCC RULES
2. EXAMPLE
S430: CONFIGURE ENERGY SAVING POLICIES BASED ON ENERGY TYPE DATA
S440: PERFORM ENERGY SAVING ACTIONS
3. EXAMPLE
S450: SECOND MAPPING PROCESS (ENERGY MEASUREMENTS TO ENERGY TYPES)
S460: REPORT RESULTS OF SECOND MAPPING
4. EXAMPLE
S470: Namf_Location_ProvideLocationInfo (TARGET UEs)
S475: PROVIDE CELL ID AND/OR LOCATION INFORMATION PER TARGET UE
S480: ENERGY TYPE DATA OF SERVING gNB
S490: DERIVE RAN/CN ENERGY MIXTURE, EXPOSE INFO TO CONSUMER

ENERGY TYPE AWARE CONTROL MECHANISM FOR COMMUNICATION NETWORK

BACKGROUND

Field

Examples of embodiments described herein relate to apparatuses, methods, systems, computer programs, computer program products and (non-transitory) computer-readable media usable for conducting control processes in a communication network taking into account energy types used for supplying power to the communication network. In particular, some examples of embodiments relate to apparatuses, methods, systems, computer programs, computer program products and (non-transitory) computer-readable media usable for a mechanism which enables to determine the energy type which is used for the communication network or parts of the communication network and to consider this in control processes in the communication network, for example in connection with operations for optimization or reporting.

Background

The following description of background may include insights, discoveries, understandings or disclosures, or associations, together with disclosures that are not already known, but rather provided herein by the disclosure as one or more examples of embodiments. Some of examples of embodiments may be specifically pointed out below, whereas other of such contributions will be apparent from the related context.

The following meanings for the abbreviations used herein apply:

3GPP 3$^{rd}$ Generation Partnership Project
4G fourth generation
5G fifth generation
5GC 5G core
AI artificial intelligence
AF application function
AMF access and mobility management function
CN core network
CP control plane
CPU central processing unit
CU centralized unit
DL downlink
DN data network
DU distributed unit
EC energy consumption
EE energy efficiency
NB E-UTRAN Node B
GHG greenhouse gas
gNB next generation node B
ID identification, identifier
KPI key performance indicator
LTE Long Term Evolution
LTE-A LTE Advanced
MDAS management data analytics service
ML machine learning
MnS management service
NEF network exposure function
NF network function
NRF network repository function
NSC network slice customer
NW network, network side
NWDAF network data analytics function
OAM operations administration and maintenance
PCC policy and charging control
PCF policy control function
PDU packet data unit
PLMN public land mobile network
PNF physical network function
QoS quality of service
RAN radio access network
SMF session management function
SON self-organizing network
UDM unified data management
UDR unified data repository
UE user equipment
UL uplink
UP user plane
UPF user plane function
WLAN wireless local area network

SUMMARY

According to an example of an embodiment, there is provided, for example, an apparatus for use by a communication network control element or communication network control function acting as an operation and maintenance entity of a communication network, the apparatus comprising at least one processing circuitry, and at least one memory for storing instructions that, when executed by the at least one processing circuitry, cause the apparatus at least: to obtain energy type data related to an energy supply of at least a part of the communication network, to conduct a first mapping process of mapping the obtained energy type data to at least one network element or network function of the communication network or to at least one communication operation conducted in the communication network, and to process a result of the first mapping process for conducting a report operation or network optimization operation based on the energy type data.

Furthermore, according to an example of an embodiment, there is provided, for example, a method for use in a communication network control element or communication network control function acting as an operation and maintenance entity of a communication network, the method comprising obtaining energy type data related to an energy supply of at least a part of the communication network, conducting a first mapping process of mapping the obtained energy type data to at least one network element or network function of the communication network or to at least one communication operation conducted in the communication network, and processing a result of the first mapping process for conducting a report operation or network optimization operation based on the energy type data.

According to further refinements, these examples may include one or more of the following features:

the energy type data related to an energy supply of at least a part of the communication network may comprise at least one of: information specifying an energy type according to an energy source used for the energy supply, information specifying a characteristic of an energy source used for the energy supply, information indicating a respective partition of an energy type of a specific characteristic, information indicating a mixture of different energy types used for the energy supply and a respective partition of the different energy types, information indicating an energy service area of an energy type powered by the energy supply, information indicating a point of supply of an energy type used for the energy supply, information indicating a duration of availability of an energy supply by an energy type, information indicating a price for an energy supply by an energy type, or information indicating an available amount of an energy type;

the energy type data may be obtained from at least one application function associated to an energy supplier for at least a part of the communication network;

the energy type data may be obtained by using a specified event identification indicating a capability of providing the energy type data;

changes in at least one of an availability of at least one energy type, or an energy supplier providing an energy type may be derived;

in the first mapping process, location information related to a network element or network function may be mapped to an energy service area or point of supply of an energy type indicated in the energy type data, and an energy type or a mixture of energy types used for the energy supply to a network element or network function may be deduced;

a time of supply of each energy type for the energy supply to the network element or network function may be deduced;

when processing the result of the first mapping process for conducting a report operation, the result of the first mapping may be transmitted to at least one of a network element or network function of the communication network, or an external party connected to the communication network;

when processing the result of the first mapping process for conducting a report operation, a second mapping process for mapping the energy type data to energy consumption measurement data related to at least a part of the communication network may be conducted, and a result of the second mapping process may be transmitted to a network element or network function for processing the result;

the network element or network function processing the result may comprise at least one of an internal network element or network function, or an external party connected to the communication network;

the part of the communication network may comprise one of the complete communication network, a specific part of the communication network, a single network element or network function of the communication network, a specific network slice of the communication network, and a specific communication connection between two end points in the communication network;

when processing the result of the first mapping process for conducting an optimization operation, a quality of service setting may be derived depending on an available energy type or mixture of energy types, and a rule reflecting the quality of service setting may be provided to the communication network;

configure a switching rule for automatically switching between different quality of service settings for a respective availability of energy type or mixture of energy types may be configured;

the quality of service setting may define to increase an uplink/downlink data rate of a communication connection depending on an available energy type, to decrease an uplink/downlink data rate of a communication connection depending on an available energy type, and to maintain a guaranteed data rate regardless of an available energy type;

when processing the result of the first mapping process for conducting an optimization operation, an energy saving strategy depending on an available energy type or mixture of energy types may be derived, and the energy saving strategy may be provided to a network element or network function of the communication network.

According to an example of an embodiment, there is provided, for example, an apparatus for use by a communication network control element or communication network control function of a communication network, the apparatus comprising at least one processing circuitry, and at least one memory for storing instructions that, when executed by the at least one processing circuitry, cause the apparatus at least: to process configuration information for subscribing on a notification on events related to energy type data from an application function connected to the communication network, to conduct a discovery process for energy type data related to an energy supply of at least a part of the communication network by using an event identification related to energy type data, the event identification being set in the configuration for subscribing, to subscribe to an application function providing energy type data by using the event identification, and to receive energy type data related to an energy supply of at least a part of the communication network.

Furthermore, according to an example of an embodiment, there is provided, for example, a method for use in a communication network control element or communication network control function of a communication network, the method comprising processing configuration information for subscribing on a notification on events related to energy type data from an application function connected to the communication network, conducting a discovery process for energy type data related to an energy supply of at least a part of the communication network by using an event identification related to energy type data, the event identification being set in the configuration for subscribing, subscribing to an application function providing energy type data by using the event identification, and receiving energy type data related to an energy supply of at least a part of the communication network.

According to further refinements, these examples may include one or more of the following features:

the energy type data related to an energy supply of at least a part of the communication network may comprise at least one of information specifying an energy type according to an energy source used for the energy supply, information specifying a characteristic of an energy source used for the energy supply, information indicating a respective partition of an energy type of a specific characteristic, information indicating a mixture of different energy types used for the energy supply and a respective partition of the different energy types, information indicating an energy service area of an energy type powered by the energy supply, information indicating a point of supply of an energy type used for the energy supply, information indicating a duration of availability of an energy supply by an energy type, information indicating a price for an energy supply by an energy type, or information indicating an available amount of an energy type;

the configuration information for subscribing on a notification on events related to energy type data from an application function connected to the communication network may be received from an operation and maintenance entity;

- the energy type data may be received from at least one application function associated to an energy supplier for at least a part of the communication network;
- the part of the communication network comprises one of the complete communication network, a specific part of the communication network, a single network element or network function of the communication network, a specific network slice of the communication network, and a specific communication connection between two end points in the communication network;
- a quality of service setting depending on an available energy type or mixture of energy types may be received, and a rule reflecting the quality of service setting for the communication network may be determined;
- a switching rule for automatically switching between different quality of service settings for a respective availability of energy type or mixture of energy types may be received, it may be determined whether a switching between different quality of service settings is to be effected, on the basis of available energy types, and in case the determination is affirmative, the switching to the corresponding quality of service setting may be conducted;
- the quality of service setting may define to increase an uplink/downlink data rate of a communication connection depending on an available energy type, to decrease an uplink/downlink data rate of a communication connection depending on an available energy type, and to maintain a guaranteed data rate regardless of an available energy type.
- the processing may be implemented in a policy control element or policy control function of the communication network.

According to an example of an embodiment, there is provided, for example, an apparatus for use by a communication network control element or communication network control function of a communication network acting as an entity for implementing an energy saving concept in the communication network, the apparatus comprising at least one processing circuitry, and at least one memory for storing instructions that, when executed by the at least one processing circuitry, cause the apparatus at least: to receive an energy saving strategy depending on an available energy type or mixture of energy types, to process the energy saving strategy for determining a control procedure related to energy consumption in the communication network, wherein the control procedure related to energy consumption in the communication network is based on a determination of an available energy amount of a specific energy type indicated in the energy saving strategy.

Furthermore, according to an example of an embodiment, there is provided, for example, a method for use in a communication network control element or communication network control function of a communication network acting as an entity for implementing an energy saving concept in the communication network, the method comprising receiving an energy saving strategy depending on an available energy type or mixture of energy types, processing the energy saving strategy for determining a control procedure related to energy consumption in the communication network, wherein the control procedure related to energy consumption in the communication network is based on a determination of an available energy amount of a specific energy type indicated in the energy saving strategy.

The processing defined above may be implemented in a self-organizing network element or self-organizing network function of the communication network.

According to an example of an embodiment, there is provided, for example, an apparatus for use by a communication network control element or communication network control function of a communication network acting as a network analytics entity, the apparatus comprising at least one processing circuitry, and at least one memory for storing instructions that, when executed by the at least one processing circuitry, cause the apparatus at least: to obtain domain specific energy consumption information in at least a part of the communication network, to receive mapping data including a mapping of location information related to a network element or network function to an energy service area or point of supply of an energy type or a mixture of energy types, to derive, on the basis of the domain specific energy consumption information and the mapping data, energy mixture information related to the part of the communication network or to a communication connection in the communication network, and to expose the energy mixture information to an internal network element or network function, or an external party connected to the communication network.

Furthermore, according to an example of an embodiment, there is provided, for example, a method for use in a communication network control element or communication network control function of a communication network acting as a network analytics entity, the method comprising obtaining domain specific energy consumption information in at least a part of the communication network, receiving mapping data including a mapping of location information related to a network element or network function to an energy service area or point of supply of an energy type or a mixture of energy types, deriving, on the basis of the domain specific energy consumption information and the mapping data, energy mixture information related to the part of the communication network or to a communication connection in the communication network, and exposing the energy mixture information to an internal network element or network function, or an external party connected to the communication network.

The above defined processing may be implemented in a network data analytics element or network data analytics function of the communication network, or in a management data analytics service element or management data analytics service function of the communication network, or in an analytics function of a different network domain.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of: upload; download; and/or push procedures.

BRIEF DESCRIPTION OF THE DRAWINGS

Some examples of disclosure related to embodiments are described below, by way of example only, with reference to the accompanying drawings, in which:

FIG. 3 shows a signaling diagram illustrating an example of a control procedure according to examples of embodiments;

FIG. 4 shows a signaling diagram illustrating an example of a control procedure according to examples of embodiments;

DETAILED DESCRIPTION

Figure 1:
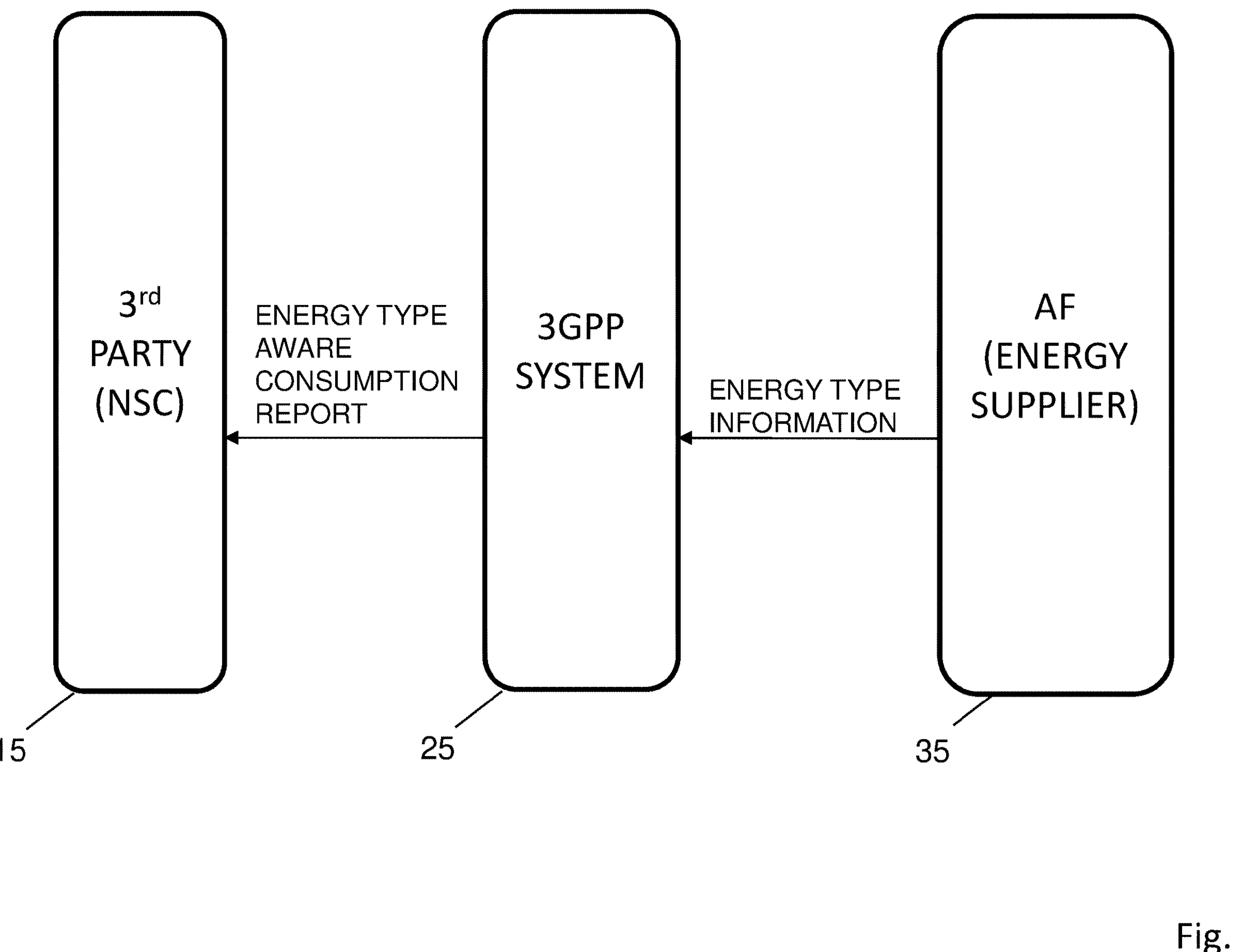
FIG. 1 shows a diagram illustrating an example of a data flow according to examples of embodiments.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular 3$^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular 2$^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the 3$^{rd}$ Generation Partnership Project (3GPP), Telecoms & Internet converged Services & Protocols for Advanced Networks (TISPAN), the International Telecommunication Union (ITU), 3$^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Energy efficiency and energy consumption are characteristics of communication networks which become more and more important. In this connection, multiple studies have been conducted and standard specification derived in the context of energy efficiency and energy consumption measurements and metrics. For example, energy efficiency (EE) KPIs are defined that can be applied to the whole network (i.e. end-to-end), sub-networks (e.g. RAN, CN), network parts, single network elements or telecommunication sites (such as data centers). Energy consumption (EC) KPIs are used to derive EE KPIs. Telecommunication networks EE KPIs are defined by various organizations and are of various natures. Moreover, EE KPIs can also be categorized according to the operator's network life cycle phase they may apply to, e.g. during the buy phase, the design/build phase, and during the run phase. Generally, EE KPIs for network elements are expressed in terms of data volume divided by the energy consumption of the considered network elements. In the case of radio access networks, an EE KPI variant may also be used, expressed by the coverage area divided by the energy consumption of the considered network elements. Energy consumption can be defined, for example, as a value in kilowatt-hours (kWh).

Operators are aiming at decreasing power consumption in networks to lower their operational expense with energy saving management solutions. The energy saving decision making is typically based on the load information of the related cells/UPFs, the energy saving policies set by operators and energy saving recommendations provided by MDAS. To achieve an optimized balance between the energy consumption and the network performance, management data analytics (MDA) can be used to assist the MDAS consumer to make energy saving decisions.

The MDA analyzes energy saving related performance measurements and network analysis data to provide analytics results which indicate current network energy efficiency. The MDAS producer reports to MDAS consumer the energy efficiency issues (e.g., high energy consumption, low energy efficiency), and their cause.

To make the energy saving decision, MDAS consumers have to determine which EE KPI related factor(s) (e.g. traffic load, end-to-end latency, active UE numbers, etc.) are affected or potentially affected. For this, the MDAS producer may predict EE KPI related factors (e.g. load variation of cells at some future time, etc.), which is then usable by operators to make energy-saving decision to guarantee the service experience. Furthermore, energy saving related recommendation may be provided wherein a required network performance and network experience has to be guaranteed. Thus appropriate energy saving policies defining, for example, a start time, threshold settings, communication parameter configuration and the like are to be provided. The MDAS consumer can consider these recommendations for analysis or energy saving decisions.

Recently, reduction of greenhouse gas (GHG) emissions is in the focus of many companies. GHG emissions can be categorized into direct GHG emissions, i.e. direct GHG emissions occurring from sources that are owned or controlled by the company, for example, emissions produced by the company's own facilities and vehicles, electricity indirect GHG emissions, i.e. GHG emissions from the generation of purchased electricity consumed by the company, and other indirect GHG emissions, i.e. emissions which are a consequence of the activities of the company, but occur from sources not owned or controlled by the company. For telecommunication related operations of the companies, mainly indirect GHG emissions are of relevance, e.g. due to telecommunication services they use. In order to reduce the GHG footprint, it is an option to adapt, for example, a QoS being acceptable depending on the sort of energy used, for example, in the network slice which is used by the company. That is, in the context of the network slice(s) they get from their Network Slice Provider(s) (NSP), the companies as network slice consumers (NSC) may decide to accept some limited QoS degradation from their NSP(s), provided they can specify which QoS limitation they are ready to accept, and related energy savings can be measured and reported to them. That is, an energy aware QoS management is conceivable.

Another option for reducing the GHG footprint is to consume renewable energy. That is, for cutting down on emissions and increasing network efficiency, operators have an interest in powering their network using renewable energy sources. In this context, it is important for operators to know the proportion of energy consumed in their networks that is sourced from renewable sources, which can be made available to customers and authorized third parties.

For example, assuming a network operator R has deployed a 5G network "N" and is promoting its services as "Green Energy", e.g. since 60% (as an illustrative example, any number may apply here) of the energy required for network operations is sourced from renewable energy resources. A company X, which places a high value on environmental sustainability, has subscribed to R's Green Energy services requesting for minimum ratio of renewable energy used for the communication service. R provides X with a dedicated slice (or NPN) guaranteeing this minimum ratio. R provides periodic reporting information regarding the percentage of renewable energy utilized. As a result, X knows the usage factor of renewable energy and can use this information, e.g. for receiving tax credits.

Projecting this approach to a 5G communication system, subject to operator's policy, the 5G system has to be able to provide to a 3rd party a dedicated NPN or a network slice that operates above a minimum ratio of renewable energy, and to provide to the 3rd party a report of the ratio of renewable energy used to provide dedicated communication service to the 3rd party on periodic basis (e.g. monthly or yearly).

In other words, considering that there are different energy sources existing, producing different energy types, e.g., renewable/green energy, carbon-free energy, solar-, wind-originated etc., the equipment and infrastructure of the communication network may be powered by different types of energy sources. That is, each service provided by the network may be powered by a single energy type or an energy type mixture. As described above, consumers of such services may be interested to know the amount of renewable energy used to power their service. Moreover, the consumers of such services may request some minimal amount/ratio for renewable energy to be used for the service realization.

On the other hand, the availability of different energy types e.g., green energy, renewable, carbon neutral energy may have an impact to energy saving decisions as well as QoS management. For example, different energy saving policies may be applicable in the context of different energy types. As an example, a more aggressive energy saving strategy may be applied in the case that mainly (or only) a non-renewable energy type is available. Similarly, different QoS optimization policies may be applicable in the context of different energy types.

In order to be able to provide a corresponding control process allowing such an energy type aware management of the communication network, it is proposed, according to examples of embodiments, to enable that there is an awareness of energy types used within the network. As a consequence, corresponding information on energy types is to be provided to the network management and to be used in automation procedures. That is, means are provided allowing to take into account the availability of different energy types in network and service management.

According to examples of embodiments, means are provided, in particular, with regard to the following points:

- providing information regarding the energy type or mixture of energy types powering the network (e.g., powering some parts of the network, set of NFs, or a single NF) and powering a particular service,
- conveying available energy type information to control entities in the communication network system;
- using the information on different energy types for management and automation procedures, such as QoS management and energy saving management;
- exposing energy consumption metrics per energy type towards the service consumer.

In the following, different examples of embodiments will be described for illustrating a processing for conducting control processes in a communication network taking into account energy types used for supplying power to the communication network, i.e. an energy type aware control and management of the communication network. To this end, as one example of a communication network to which examples of embodiments may be applied, a communication network architecture based on 3GPP standards for a communication network, such as 5G, is used, without restricting the disclosure to such an architecture. It would be apparent to a person skilled in the art that examples of embodiments may also be applied to other kinds of communication networks, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of described herein can be extended and applied to any other type of communication network, such as a wired communication networks as well.

The following examples and embodiments are to be understood only as illustrative examples. Although the text herein may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also comprise features, structures, units, modules etc. that have not been specifically mentioned.

A basic system architecture of a (tele) communication network, including a mobile communication system, where some examples of embodiments are applicable may include an architecture of one or more communication networks including wireless or wired access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as user equipments, e.g. user devices or terminal devices, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases, and the like may be included.

The general functions and interconnections of the described elements and functions, which also depend on the actual network type, are understood by those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet, as well as with individual devices or groups of devices being not considered as a part of a network, such as monitoring devices like cameras, sensors, arrays of sensors, and the like. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element or network functions, such as an OAM entity, an AF, a NEF, a PCF or other network elements or network functions, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are utilized for control, processing and/or communication/ signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted herein that processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. For instance, a "division of labor" between involved network elements, functions or entities may vary case by case.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used herein, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

According to examples of embodiments of the invention, in order to enable to consider the availability of different energy types in network and service management, it is proposed to provide a mechanism for enabling energy type/ mixture aware network management and automation.

For this purpose, according to examples of embodiments, information about available energy types/mixtures of energy types is conveyed towards the 3GPP system. That is, mechanisms for collecting data from an AF are enhanced so that an energy (electricity) supplier can be regarded as a 3$^{rd}$ party AF that can provide suitable information towards the communication system, in particular towards the OAM.

The information being provided and processed in the OAM are referred to as energy type data which are related to the energy supply of at least a part of the communication network. The energy type data include one or more of the following information pieces: information specifying an energy type or a characteristic (such as renewable energy, non-renewable energy, or the like) according to an energy source (such as solar, wind, gas, nuclear, or the like) used for the energy supply, information indicating a mixture of different energy types used for the energy supply and a respective partition of the different the energy types (such as, for example, 40% renewable energy and 60% non-renewable energy, or the like), information indicating an energy service area of each energy type powered by the energy supply, information indicating a point of supply of an energy type used for the energy supply (such as a specific electricity exchange point or socket powering one or more network elements or the like, e.g. specific gNBs, cells, transport network equipment, cloud data centers, etc.), information indicating a duration of availability of an energy supply by an energy type (e.g. a time period where a specific energy type like renewable energy is available, or the like), information indicating a price for an energy supply by an energy type, or information indicating an available amount of an energy type (for example, a specific amount of kWh or the like).

Furthermore, according to examples of embodiments, a specific event ID (which is referred to as "energy type", for example) is provided which is required to indicate that an AF is capable of providing the information regarding the energy type (or regarding a change of energy type), such as renewable, green, wind, solar, carbon-free, non-renewable, etc. energy types, along with further information, e.g., location (energy service area or point of supply).

Furthermore, according to examples of embodiments, a processing is enabled allowing to map the energy type information to respective NFs or communication operations. That is, according to examples of embodiments, it can be identified which NF is supplied by which energy type, such as renewable or not, and at what time which energy type is supplied. For example, configuration management entities have information on the NFs location. Thus location information is then mapped to energy service area or point of supply of a specific energy type as provided by the AF with the energy type data. Furthermore, according to examples of embodiments, a mixture of energy types of PNFs, such RAN nodes (gNBs), or of specified parts of the communication network and its operational entities, including CU-UP, CU-CP, DU components, is identified. Alternatively or additionally, the mapping of the energy type can be also made to a communication operation, such as a data connection, PDU session, QoS flow, link between the NFs, or a specific functionality distributed in different parts of the communication network, or the like.

In addition, according to examples of embodiments, the obtained information, such as the energy type data or results of the mapping processing, which inform about the mixture of energy types, are used for optimizing network management procedures. For example, according to examples of embodiments, a control procedure related to energy consumption in the communication network is determined. For example, energy saving decisions can be enhanced; this is achieved by deriving, for example, cell switch on/off thresholds so as to save energy particularly when no renewable energy is supplied.

Moreover, according to some examples of embodiments, QoS settings can be adjusted allowing to derive, for example, PCC rules in case of using green energy and PCC rules in case of using non-green energy, for example. For this purpose, policy information is provided by the OAM to the PCF indicating how to handle availability of different energy types. For example, if it is determined that (sufficient) renewable energy is available, a maximum UL/DL data rate may be increased in PCC rules, or otherwise a maximum UL/DL data rate may be decreased. Also an indication that a guaranteed UL/DL data rate is to be maintained unchanged regardless of the availability of the energy type can be indicated.

Furthermore, according to examples of embodiments, instructions are provided which automate a switching between different policies for QoS management. For example, the OAM derives policies and conditions when a certain PCC rule (such as a PCC rule following a more aggressive energy saving strategy) should be activated (e.g. when the amount of available renewable energy is below a certain threshold). Corresponding rules are configured at the PCF, for example, wherein dynamic PCC rules are provisioned by the PCF to network elements implementing the ruses, e.g. to the SMF, once the conditions for the switching are met.

Moreover, according to examples of embodiments, energy consumption metrics or measurements per energy type are provided to interested 3$^{rd}$ parties, e.g. upon request. This is realized, for example, by extensions of energy consumption/efficiency counters with an indication of energy type (e.g. renewable or non-renewable energy).

In addition, according to examples of embodiments, analytics related to domain (RAN/CN) specific energy consumption with energy type/mixture of energy type awareness are derives and provided to interested 3$^{rd}$ parties.

With reference to FIG. 1, an example of a data flow according to examples of embodiments is explained. Specifically, as shown in FIG. 1, a 3GPP system 25 represents a communication network in which an energy type aware management process according to the principles defined above is implemented. Reference sign 35 denotes an AF which represents an energy supplier. Reference sign 15 denotes a 3$^{rd}$ party, such as a network slice consumer.

As indicated by an arrow between the AF 35 and the communication system 25, energy type information or data is conveyed from the energy supplier to the network, e.g. an OAM entity of the like. In the communication network 25, an energy type aware management processing (concerning, for example, energy saving or QoS management processes) can be executed. Furthermore, as indicated by an arrow between the communication system 25 and the 3$^{rd}$ party 15, report information regarding an energy consumption considering energy types being used in the communication operation can be provided to the 3$^{rd}$ party.

That is, according to examples of embodiments, for the processing indicated in FIG. 1, for example, management services are provided which enable a MnS consumer to execute an energy type aware management. These services comprise:

- a service to enable a MnS consumer to retrieve information on the available energy types or mixture of energy types that power the network (e.g., information on availability of renewable energy along with further information, e.g. location (energy service area or point of supply));
- a service to enable a MnS consumer to take into account the energy type availability in management and optimization procedures, such as energy saving and QoS optimization; and
- a service to enable a MnS provider to expose energy consumption metrics and KPIs related to different energy types/mixtures of energy types, or to perform and expose analytics based on energy type information, for example, on different levels of the network infrastructure or for different domains of the network.

Figure 2:
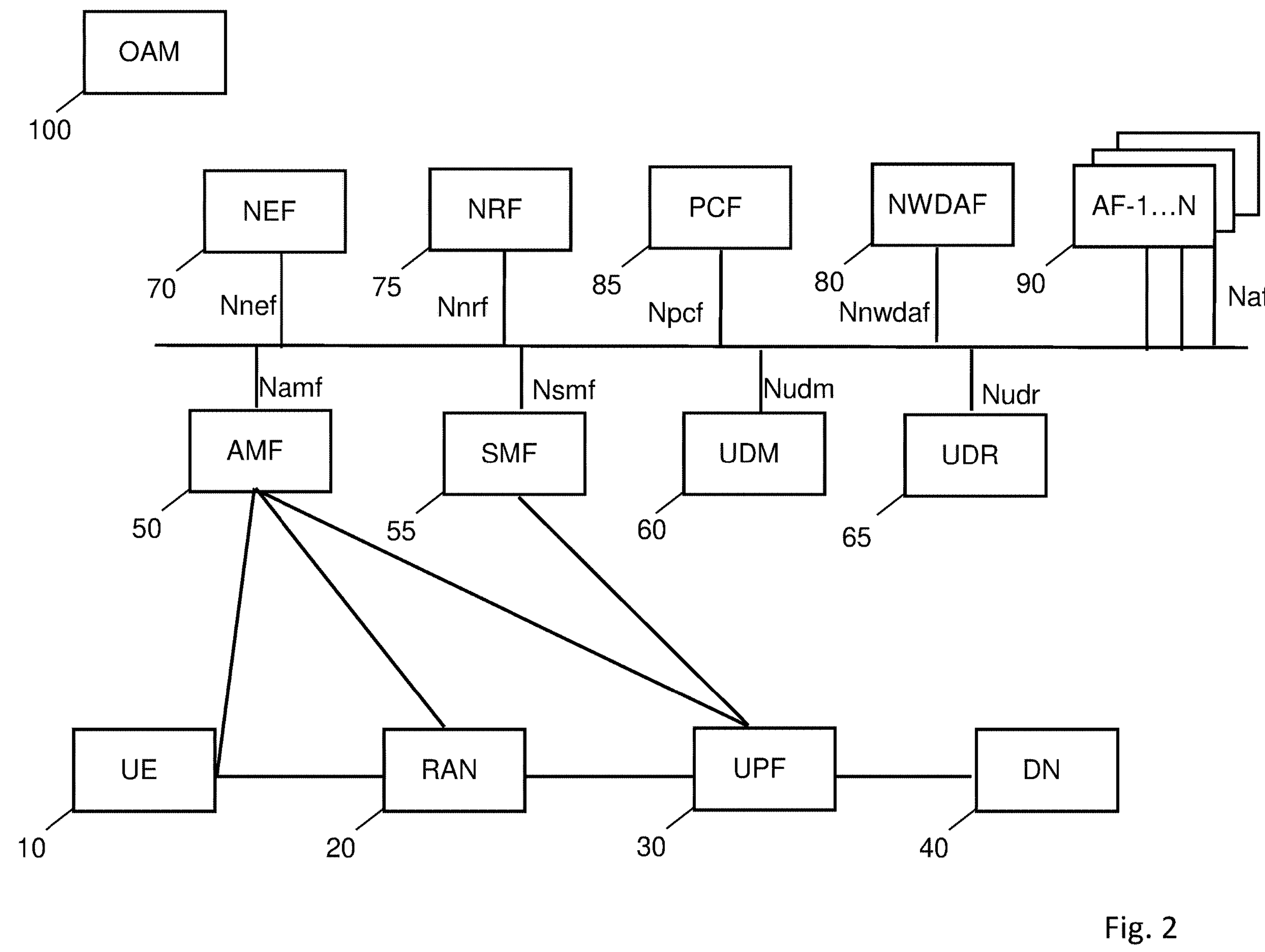
FIG. 2 shows a diagram illustrating an example of a communication network environment in which examples of embodiments are implementable.

As an illustrative example for a communication network architecture used for the 3GPP system 25 shown in FIG. 1, FIG. 2 shows a diagram illustrating, as an example of a communication network environment in which examples of embodiments are implementable, a 5G communication network according to 3GPP standardization.

As shown in FIG. 2, a UE 10 is located in the communication network environment and connects to the communication network (e.g. the 5G network) via a RAN 20. The UE 10 is connected over the RAN 20 to data networks DN 40 (for example, the Internet). The entry point for the UE is AMF 50. The UE 10 requests the AMF 50 for a particular service, and depending on the service, a SMF 55 for managing the user session is selected. UPF 30 is used to transport IP traffic to and from the UE and the external network.

Furthermore, as shown in FIG. 2, an OAM entity 100 is provided. The OAM entity 100 represents processes and functions used in provisioning and managing the communication network or an element within the network. OAM functions concern operations and maintenance functions which provide necessary tools for e.g. network operators to operate and maintain the networks. It is to be noted that the functionality of the OAM entity 100 may reside in a single entity, such as a server, or may be distributed over a plurality of entities. For the sake of simplicity, in the following, it is assumed that the OAM functionality is provided by the OAM entity 100 as shown in FIG. 2.

Furthermore, in the 5G core network part, besides the AMF 40, which supports mobility management, access authentication and authorization, security anchor functions and context management, and the SMF 55, which supports session management, selection and control of User Plane (UP) functions, downlink data notification and roaming, various network functions are provided having specified tasks in the communication control.

Generally, the 5G core network provides secure and reliable connectivity to the Internet and access to all of the networking services. 5G core network has numerous essential functions for mobile networking like mobile management, subscriber data management, authorization, authentication policy management, etc. It is to be noted that the 5G core may be completely software-based and native to the cloud. FIG. 2 shows only a part of possible core network functions, and there are several other network functions which are basically known to those skilled in the art which are not directly involved in a processing according to examples of embodiments, so that these functions are omitted here for the sake of simplicity.

Furthermore, as shown in FIG. 2, the core network elements or functions are connected to each other by using respective interfaces, such as Namf in the case of the AMF 50, and the like, which are shown in FIG. 2 as examples, but which are not further described here.

Core network elements shown in FIG. 1 comprises, for example, UDM 60, which is in charge of creating the credentials needed for authentication, granting access depending on user subscription, and sending those credentials to the other network functions. UDR 65 provides the credentials to the UDM 60.

PCF 85 provides policy rules to control plane functions (e.g. AMF) to enforce them, and accesses subscription information relevant for policy decisions. That is, the PCF 85 supports unified policy framework to govern network behavior and provides policy rules to control plane functions.

Furthermore, NEF 70 is provided which is used for securely exchanging information between services and 3GPP NFs. The NEF 70 is located between the 5G core network and external application functions (such as an energy supplier) and is responsible for managing the external open network data. The NEF 70 supports exposure of network functions capabilities in 5G system to external network functions such as 3rd party AFs. External exposure comprises e.g. a monitoring capability, a provisioning capability, and an analytics reporting capability. The monitoring capability is for monitoring of specific events for a UE in the 5G System and making such monitoring events information available for external exposure via the NEF 70. The provisioning capability is for allowing an external party to provide information which can be used for the UE in the 5G System. The analytics reporting capability is for allowing an external party to fetch or subscribe/unsubscribe to analytics information generated by the 5G System. All external applications that want to access the internal data of the 5G core must pass through the NEF 70. The NEF 70 also provides security when services or AFs access 5G Core nodes.

NRF 75 is used for service discovering. It maintains deployed NF instance information when deploying/updating/removing NF instances.

NWDAF 80 represents an operator managed network analytics logical function. The NWDAF 80 supports data collection from NFs and AFs, supports data collection from OAM, and supports analytics information provisioning to NFs, AF.

Furthermore, one or more AFs 90 are connected to the network. As indicated above, an energy supplier which provides information related to the energy type data is represented by AF 90, for example. As indicated above, there is a possibility that multiple energy suppliers are present wherein each energy supplier can then be represented by an own AF (i.e. AF-1 to AF-N).

Even though it is not shown in FIG. 2, as a further network element or network function involved in some examples of embodiments, a network element or network function implementing an energy saving concept in the communication network may be provided by an energy saving SON function, which may conduct a control procedure related to energy consumption in the communication network, such as making different decisions such as switching on/off capacity cells to save energy. Switching on/off of cells is based, for example, on a load level of the respective cell. According to examples of embodiments, control procedures related to energy consumption in the communication network, such as switching on/off of cells, by the SON function considers also an input on energy type information which is then considered in the control procedure related to energy consumption in the communication network, e.g. the cell switch on/off decisions (for example, first cells supplied by non-renewable energy are switched off).

From the elements and functions depicted in FIG. 2, OAM, PCF, SON, NWDAF consider in the processing thereof energy type related information, wherein an energy-type aware output is provided. In this context, the OAM entity is configured to conduct processing related to a retrieval of the energy type information or data from a 3$^{rd}$ party (i.e. AF 90), a mapping of the energy type data with configuration information related to NF location so as to derive information which NF is supplied with what energy type, a mapping of energy consumption measurements with energy type data, an exposure of energy type aware information to consumers, either external consumers such as network slice consumer, or internal consumers such as analytics function or core network functions so that they can perform further energy type aware analytics, decisions etc.

FIGS. 3 and 4 show signaling diagrams illustrating an example of a control procedure according to examples of embodiments. Specifically, in FIGS. 3 and 4, a procedure is depicted in which energy type data usable for an energy type/energy mixture aware management and automation process are retrieved and employed according to examples of embodiments of the disclosure.

In S300, an AF (such as an AF representing an energy supplier) registers its available data via OAM configuration at the NEF. The data that can be collected from the AF includes, for example, an AF identification, an AF service identification (e.g. endpoint information of Naf_EventExposure), available data to be collected per application (e.g. identified by Event ID(s), in the present example including also the event ID "energy type"). After the registration of AF available data at the NEF, the NEF generates an event exposure with new EventID to be associated with available data to be collected from the AF. This information is stored in the NF profile of the NEF which is updated with the new Event IDs and associated AF identification, Application ID(s). Such update is reflected at the NRF.

In S310, an NF, e.g. the PCF (or another NF being applicable) is configured (e.g., by the OAM) to subscribe to notifications on events related to energy type (e.g. energy mixture or energy type) information from an AF. For example, in the case of a non-trusted AF, this communication is executed via the NEF. The Event ID "energy type" indicating the data being related to energy type, along with associated information such as time or location related information (e.g. energy service area, point of supply, duration of availability of supply etc.) can provided in S310 as well.

In S320, when the NF, e.g. the PCF, has to perform a discovery process for available data from AFs and the appropriate NEF to collect this data, it invokes an Nnrf_NF-Discovery_Request_request service operation using as parameter the NEF NF type, a list of Event ID(s) and optionally an AF identification and application ID. In order to discover the energy type data availability, the NF, i.e. the PCF, provides the EventID "energy type" which is related to energy types, as provided, for example, in S310.

In S330, the NRF matches the requested query for available data in AFs with the registered NEF profiles and sends this information via Nnrf_NFDiscovery_Request_response message to the requesting NF, i.e. the PCF. That is, the NRF responds to request in S320 with the indication of the corresponding NEF where the data on energy type information from AF is registered.

In the following, according to S340 to S370, the NF, e.g. the PCF, subscribes to data in an AF via the NEF by using Nnef_EventExposure_Subscribe wherein the EventID "energy type" related to energy types is indicated (see S340).

If the event subscription is authorized by the NEF, the NEF records the association of the event trigger and the NF identity. Based on such a request, the NEF subscribes in S350 to data in AF by invoking the Naf_EventExposure_Subscribe, wherein the EventID "energy type" related to energy types is indicated.

The AF notifies the NEF in S360 with the data (i.e. energy type data) by invoking Naf_EventExposure_Notify providing the information on the available energy types along with further information, such as the energy service area or point of supply of the energy types. Further information such as expected duration of energy type availability, price, etc. can also be provided in S360.

Once the NEF gets the notification from the AF, the NEF notifies in S370 the NF (i.e. the PCF) by Nnef_EventExposure_Notify. In this connection, the energy type data being retrieved from the AF are provided as well.

In S380, the OAM retrieves the information on the available energy types from the NEF by reading the afEvents attribute from AfEventExposureData object. This represents AF Event(s) exposed by the NEF after registration of the AF(s) at the NEF. In this way, the OAM can inquire changes in the availability of different energy types or conditions thereof. Furthermore, also different energy suppliers (different AFs and corresponding NEFs) can be determined.

In S390, the OAM conducts a first mapping processing. Specifically, in S390, the OAM configuration management maps the known NF location with the energy type data, i.e. the information provided by the AF on the energy service area or point of supply. Thus, the OAM can deduce which NF is supplied with which energy type (or mixture of energy types). The result of the mapping, i.e. the corresponding mapping information, can then be used for further control procedures, such as reporting procedures or network optimization procedures.

For example, the mapping result information can be further requested and used by different consumers (e.g. NFs) for deriving optimization and control decisions, performing analytics and the like, which can be based on energy type or mixture awareness. In the following, with regard to FIG. 4, different examples are describes where such information is used.

Specifically, as an Example 1, an energy type/mixture aware QoS control and optimization process is described.

In S410, the information on available energy types provided by the energy type data is used to derive and configure suitable QoS policies towards the PCF. In these QoS policies, it is defined how to handle a situation when different energy mixtures are available, e.g. renewable energy and non-renewable energy in different and/or varying proportions. For example, the QoS policy can define that, depending on the amount of renewable energy being available, an increase or decrease of the maximum UL/DL data rate is to be defined in corresponding PCC rules employed in the network. Furthermore, it can be defined that a guaranteed UL/DL data rate is to be kept unchanged regardless of the availability of a respective energy type. Furthermore, the OAM can define policies and conditions when certain PCC rule is to be activated, for example by indicating certain thresholds for an available amount of renewable energy, or the like. The QoS setting information defining the corresponding rules are then configured at the PCF which then determines in S420 corresponding dynamic PCC rules to be provisioned by the PCF to the corresponding NF (e.g. the SMF) once predefined conditions (e.g. thresholds) are met. That is, the PCF determines the PCC rules following the guidelines from OAM.

As an Example 2, an energy type/mixture aware energy saving example is described.

That is, in S430, the OAM uses the information on available energy types to derive and configure policies for energy saving. For example, it can be defined that a more aggressive energy saving strategy is to be employed in the case that mainly non-renewable energy is available. The decision to use the corresponding energy saving strategy may depend on thresholds, e.g. of an available amount of renewable energy. The corresponding strategy information are then provided to a NF which is capable of implementing the corresponding energy saving measures, for example to a corresponding SON element or function which then executes in S440 the derived policies.

As an Example 3, an energy type/mixture aware energy consumption reporting example is described.

In S450, the OAM conducts a further (second) mapping procedure. Specifically, the information on available energy types are mapped to obtained energy consumption measurements. The corresponding energy consumption measurements are derived from corresponding network functions, for example. The mapping can be done on different levels. For example, energy consumption for single NF function, a network slice, a part of the network (e.g. RAN elements in a certain area) and the like can be considered.

Then, in S460, the result of the second mapping processing, i.e. the information on energy consumption measurements along with the information on which energy type has been consumed in which network part is exposed towards $3^{rd}$ party consumer, e.g. a network slice customer, which may request corresponding information, when being authorized. Alternatively or additionally, the result of the second mapping processing may be also forwarded to network elements or functions capable of processing this information, such as an NWDAF and/or MDAS for energy type aware network analytics or network management services.

As an Example 4, an energy type/mixture aware domain (e.g. RAN/CN) energy consumption derivation example is described.

In S470, an analytics function, such as an NWDAF, starts to derive domain specific (e.g. RAN or CN) energy type/mixture aware analytics. In the present example, when considering e.g. RAN domain, corresponding RAN energy consumption information related to individual UEs are collected via subscribing to the AMF Namf_Location_ProvideLocationInfo service.

In S475, the AMF provides RAN domain location information, such as cell ID and/or geo-location information per targeted UE to the NWDAF.

In S480, the analytics function retrieves information from the OAM regarding the mapping between UE's serving gNB and corresponding energy type data, such as its energy service area or point of supply.

Then, in S490, the NWDAF derives the RAN (or CN) energy type/mixture information and exposes it to interested consumers, e.g. other network functions.

It is to be noted that, while in the above example, RAN (or CN) energy type/mixture information is derived, it is also possible that the analytics function analyses an end-to-end energy consumption of a service or even at the level of individual PDU session, wherein corresponding information is then provided to interested consumers.

Moreover, while in the above described example the NWDAF is described as the analytics function, also an MDAS can be used to provide a corresponding service, either by using the same data sources such as AMF, or other sources, for retrieving UE location. Furthermore, a corresponding management service can be offered as standalone service. Alternatively, an analytics function of a different network domain, such as a RAN domain, can be used as the analytics function according to examples of embodiments.

Figure 5:
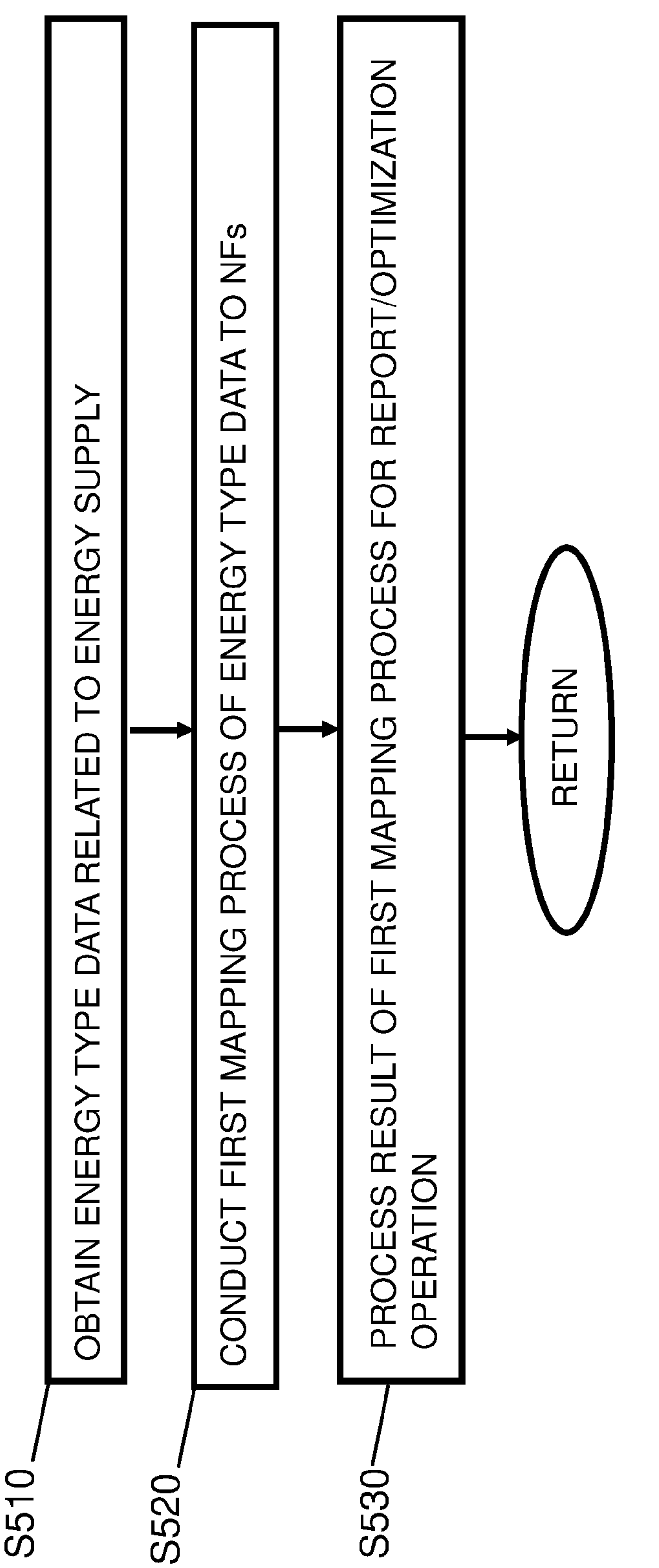
FIG. 5 shows a flow chart of a processing conducted in a communication network control element, such as a OAM entity, according to some examples of embodiments.

FIG. 5 shows a flow chart of a processing conducted in a communication network control element, such as an OAM entity, according to some examples of the disclosure. That is, FIG. 5 shows a flowchart related to a processing conducted by a communication network control element or communication network control function acting as an operation and maintenance entity, such as the OAM 100 of FIG. 2.

In S510, energy type data related to an energy supply of at least a part of the communication network are obtained.

According to examples of embodiments, the energy type data related to an energy supply of at least a part of the communication network comprises one or more of the following:

- information specifying an energy type according to an energy source used for the energy supply (such as solar, carbon-based etc.),
- information specifying a characteristic of an energy source used for the energy supply (such as renewable or non-renewable),
- information indicating a respective partition of an energy type of a specific characteristic (e.g. 40% renewable energy, 60% non-renewable energy, or the like),
- information indicating a mixture of different energy types used for the energy supply and a respective partition of the different energy types,
- information indicating an energy service area of an energy type powered by the energy supply,
- information indicating a point of supply of an energy type used for the energy supply (such as a specific electricity exchange point or socket powering one or more network elements or the like, e.g. specific gNBs, cells, transport network equipment, cloud data centers, etc.),
- information indicating a duration of availability of an energy supply by an energy type (e.g. renewable energy during day-time hours, or according to environmental conditions),
- information indicating a price for an energy supply by an energy type (e.g. prices for renewable energy amount or non-renewable energy amount),
- information indicating an available amount of an energy type (specified amount of energy, e.g. X kWh or the like).

Furthermore, according to examples of embodiments, the part of the communication network to which the energy type data are related, comprises one of the complete communication network, a specific part of the communication network (e.g. RAN, CN, geo-location area like a cell, or the like), a single network element or network function of the communication network (e.g. AMF, a gNB or the like), a specific network slice of the communication network (e.g. slice for specific NSC), or a specific communication connection between two end points in the communication network (e.g. a specific session, data connection or the like).

Moreover, according to examples of embodiment, the energy type data are obtained from at least one application function associated to an energy supplier for at least a part of the communication network, such as the AF 90 indicated in FIG. 2. Moreover, according to examples of embodiments, the energy type data are obtained by using a specified event identification (e.g. the Event ID "energy type" described above) indicating a capability (of an AF) of providing the energy type data.

In S520, a first mapping process of mapping the obtained energy type data to at least one network element or network function of the communication network or to at least one communication operation conducted in the communication network is conducted. For example, location information of a network element (a PNF) like a gNB are obtained and mapped to the energy type data. Alternatively, for example, a communication operation, such as a data connection, PDU session, QoS flow, link between the NFs, or a specific functionality distributed in different parts of the communication network, or the like is mapped to the energy type data.

In S530, a result of the first mapping process is further processed for conducting a report operation or a network optimization operation based on the energy type data.

According to examples of embodiments, by means of the first mapping, it is possible to derive changes in at least one of an availability of at least one energy type (e.g. renewable energy is available or not at specific parts of the communication network or at specified timings), or an energy supplier providing an energy type (for example, when a new energy supplier offers energy of a specified type).

According to examples of embodiments, in the first mapping process, location information related to a network element or network function is mapped to an energy service area or point of supply of an energy type indicated in the energy type data. That is, in the first mapping, a relation between locations of network parts and energy supply is derived. Thus, an energy type or a mixture of energy types used for the energy supply to a network element or network function can be deduced.

Furthermore, it is also possible to deduce a time of supply of each energy type for the energy supply to the network element or network function. That is, according to examples of embodiments, it is possible to derive, for example, which energy type is available at which part of the network at which time.

Moreover, according to examples of embodiments, when processing the result of the first mapping process for conducting a report operation, the result of the first mapping is transmitted to at least one of a network element or network function of the communication network (i.e. an internal network element or network function, such as an analytics function), or an external party connected to the communication network (e.g. a service consumer requesting corresponding information).

According to further examples of embodiments, in connection with the processing of the result of the first mapping process for conducting a report operation, a second mapping process can be conducted. In the second mapping, for example, the energy type data are mapped to energy consumption measurement data related to at least a part of the communication network. A result of the second mapping process is then transmitted to an a network element or network function for processing the result. The receiving network element or network function may be an internal network element or network function, and/or an external party connected to the communication network.

Furthermore, according to examples of embodiments, when processing the result of the first mapping process for conducting an optimization operation, a QoS setting can be derived depending on an available energy type or mixture of energy types. For example, the QoS setting defines to increase an uplink/downlink data rate of a communication connection depending on an available energy type (e.g. when renewable energy is available in a sufficient amount), or to decrease an uplink/downlink data rate of a communication connection depending on an available energy type (e.g. when renewable energy is not available in a sufficient amount), and to maintain a guaranteed data rate regardless of an available energy type (i.e. a specified data rate is kept, irrespective of the available energy type).

The QoS setting is reflected in a corresponding rule (e.g. policy rule) which is provided to the communication network (e.g. to a PCF).

In this context, according to examples of embodiments, it is also possible to configure a switching rule for automatically switching between different QoS settings for a respective availability of energy type or mixture of energy types. Such a switching is dependent, for example, on specified thresholds (e.g. regarding the amount of renewable energy being available).

Moreover, according to examples of embodiments, when processing the result of the first mapping process for conducting an optimization operation, an energy saving strategy depending on an available energy type or mixture of energy types can be derived. The energy saving strategy to a network element or network function of the communication network. For example, the energy saving strategy is provided to a network element or network function implementing a corresponding control procedure related to energy consumption in the communication network, such as cell on/off decisions.

Figure 6:
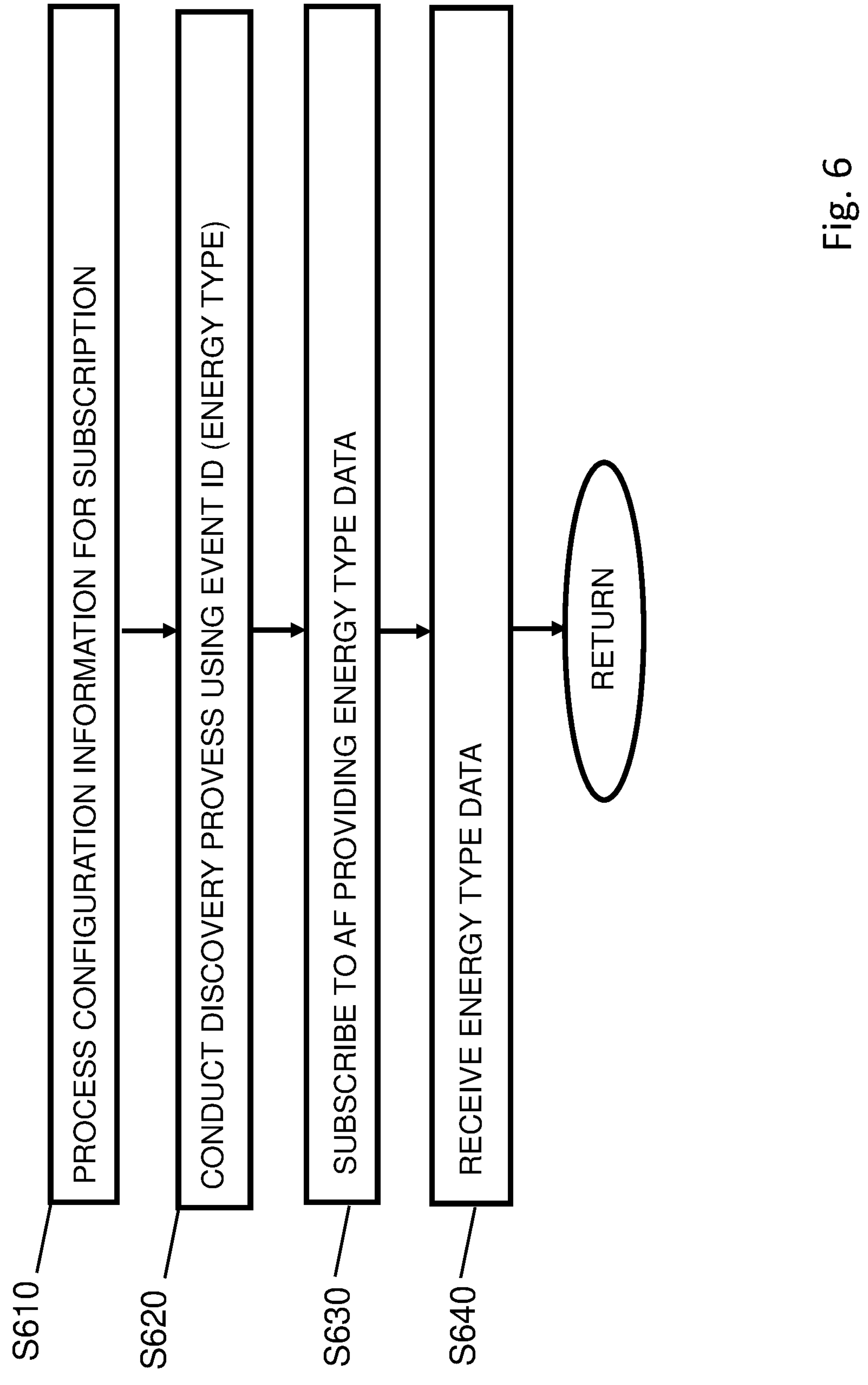
FIG. 6 shows a flow chart of a processing conducted in a communication network control element, such as a PCF, according to some examples of embodiments.

FIG. 6 shows a flow chart of a processing conducted in a communication network control element, such as a PCF, according to some examples of the disclosure. That is, FIG. 6 shows a flowchart related to a processing conducted by a network element or network function acting as a policy control function, such as the PCF 85 of FIG. 2.

In S610, configuration information for subscribing on a notification on events related to energy type data from an application function connected to the communication network are processed. For example, the configuration information for subscribing on a notification on events related to energy type data from an application function connected to the communication network is received from an operation and maintenance entity.

In S620, a discovery process for energy type data related to an energy supply of at least a part of the communication network is conducted by using an event identification related to energy type data, the event identification being set in the configuration for subscribing. For example, the event ID is "energy type", as described above.

In S630, subscription to an application function providing energy type data by using the event identification is executed.

Then, in S640, energy type data related to an energy supply of at least a part of the communication network are received. For example, the application function from which the energy type data are received is associated to an energy supplier for at least a part of the communication network, such as AF 90 of FIG. 2.

According to examples of embodiments, the energy type data related to an energy supply of at least a part of the communication network comprises one or more of the following:

- information specifying an energy type according to an energy source used for the energy supply (such as solar, carbon-based etc.),
- information specifying a characteristic of an energy source used for the energy supply (such as renewable or non-renewable),
- information indicating a respective partition of an energy type of a specific characteristic (e.g. 40% renewable energy, 60% non-renewable energy, or the like),
- information indicating a mixture of different energy types used for the energy supply and a respective partition of the different energy types,
- information indicating an energy service area of an energy type powered by the energy supply,
- information indicating a point of supply of an energy type used for the energy supply (such as a specific electricity exchange point or socket powering one or more network elements or the like, e.g. specific gNBs, cells, transport network equipment, cloud data centers, etc.),
- information indicating a duration of availability of an energy supply by an energy type (e.g. renewable energy during day-time hours, or according to environmental conditions),
- information indicating a price for an energy supply by an energy type (e.g. prices for renewable energy amount or non-renewable energy amount), information indicating an available amount of an energy type (specified amount of energy, e.g. X kWh or the like).

Furthermore, according to examples of embodiments, the part of the communication network to which the energy type data are related, comprises one of the complete communication network, a specific part of the communication network (e.g. RAN, CN, geo-location area like a cell, or the like), a single network element or network function of the communication network (e.g. AMF, a gNB or the like), a specific network slice of the communication network (e.g. slice for specific NSC), or a specific communication connection between two end points in the communication network (e.g. a specific session, data connection or the like).

According to further examples of embodiments, a QoS setting depending on an available energy type or mixture of energy types is received. Then, a rule reflecting the quality of service setting for the communication network is determined.

For example, according to examples of embodiments, a switching rule for automatically switching between different QoS settings for a respective availability of energy type or mixture of energy types is obtained. Such a switching is dependent, for example, on specified thresholds (e.g. regarding the amount of renewable energy being available). Then, it is determined whether a switching between different QoS settings is to be effected, on the basis of available energy types. In case the determination is affirmative, the switching to the corresponding Qos setting is executed. For example, the QoS setting defines to increase an uplink/downlink data rate of a communication connection depending on an available energy type (e.g. when renewable energy is available in a sufficient amount), or to decrease an uplink/downlink data rate of a communication connection depending on an available energy type (e.g. when renewable energy is not available in a sufficient amount), and to maintain a guaranteed data rate regardless of an available energy type (i.e. a specified data rate is kept, irrespective of the available energy type).

Figure 7:
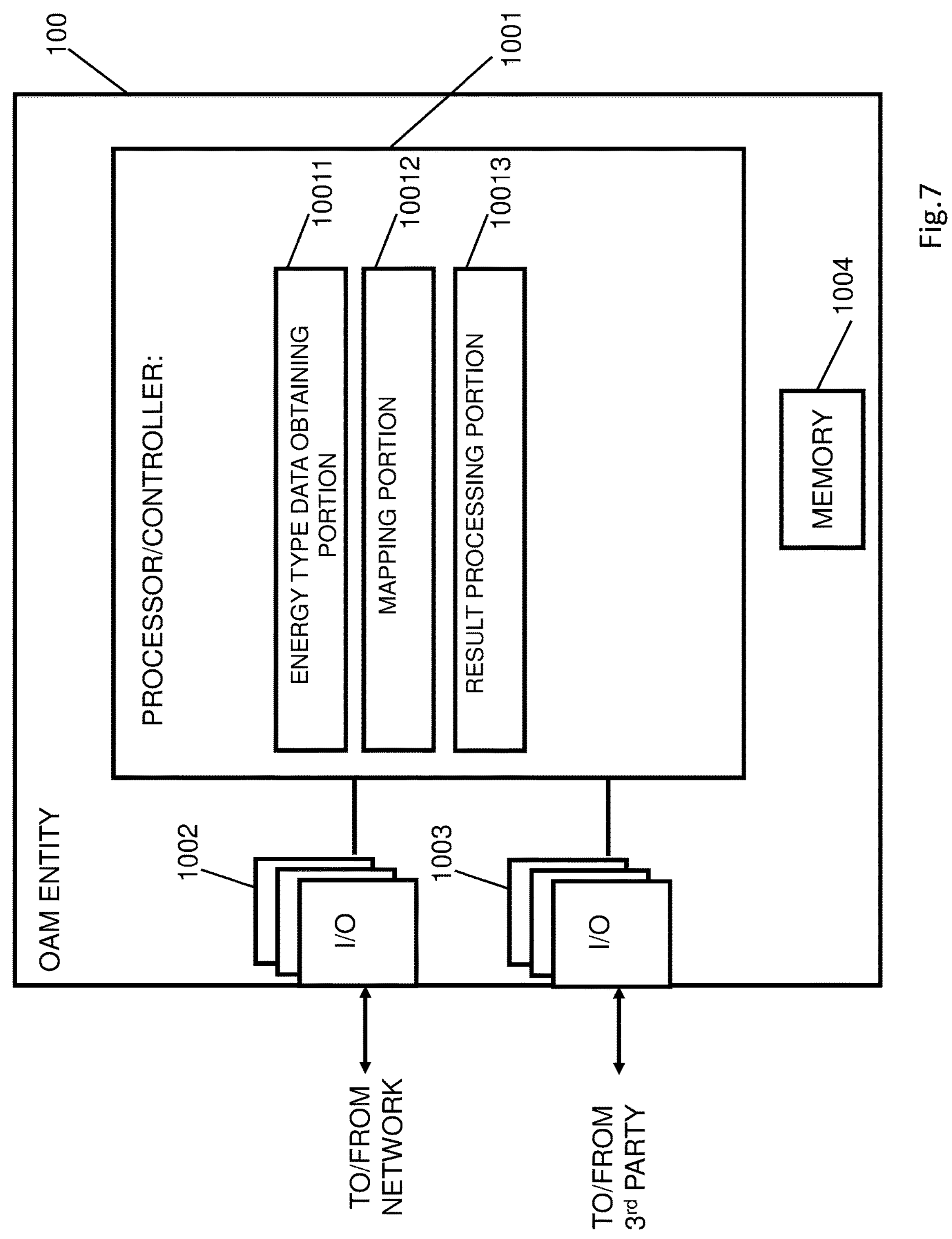
FIG. 7 shows a diagram of a communication network control element, such as an OAM entity, according to some examples of embodiments.

FIG. 7 shows a diagram of a communication network control element or communication network control function, such as an OAM entity 100, which conducts a control procedure according to some examples of the embodiments, as described in connection with FIGS. 3 and 4. It is to be noted that the network element or function such as the OAM entity 100 may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The OAM entity 100 shown in FIG. 7 may include a processing circuitry, a processing function, a control unit or a processor 1001, such as a CPU or the like, which is suitable for executing instructions given by programs or the like related to the control procedure. The processor 1001 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 1002 and 1003 denote input/output (I/O) units or functions (interfaces) connected to the processor or processing function 1001. The I/O units 1002 may be used for communicating with network elements or network functions, such as the NEF 70, the PCF 85 or the NWDAF 80. The I/O units 1003 may be used for communicating with an external entity such as $3^{rd}$ party entity. The I/O units 1002 and 1003 may be combined units including communication equipment towards several entities, or may include a distributed structure with a plurality of different interfaces for different entities. Reference sign 1004 denotes a memory usable, for example, for storing data and programs to be executed by the processor or processing function 1001 and/or as a working storage of the processor or processing function 1001. It is to be noted that the memory 1004 may be implemented by using one or more memory portions of the same or different type of memory.

The processor or processing function 1001 is configured to execute processing related to the above described control procedure. In particular, the processor or processing circuitry or function 1001 includes one or more of the following sub-portions. Sub-portion 10011 is a processing portion which is usable as a portion for obtaining energy type data. The portion 10011 may be configured to perform processing according to S510 of FIG. 5. Furthermore, the processor or processing circuitry or function 1001 may include a sub-portion 10012 usable as a portion for conducting a mapping processing. The portion 10012 may be configured to perform a processing according to S520 of FIG. 5. In addition, the processor or processing circuitry or function 1001 may include a sub-portion 10013 usable as a portion for processing a result of the mapping processing. The portion 10013 may be configured to perform a processing according to S530 of FIG. 5.

Figure 8:
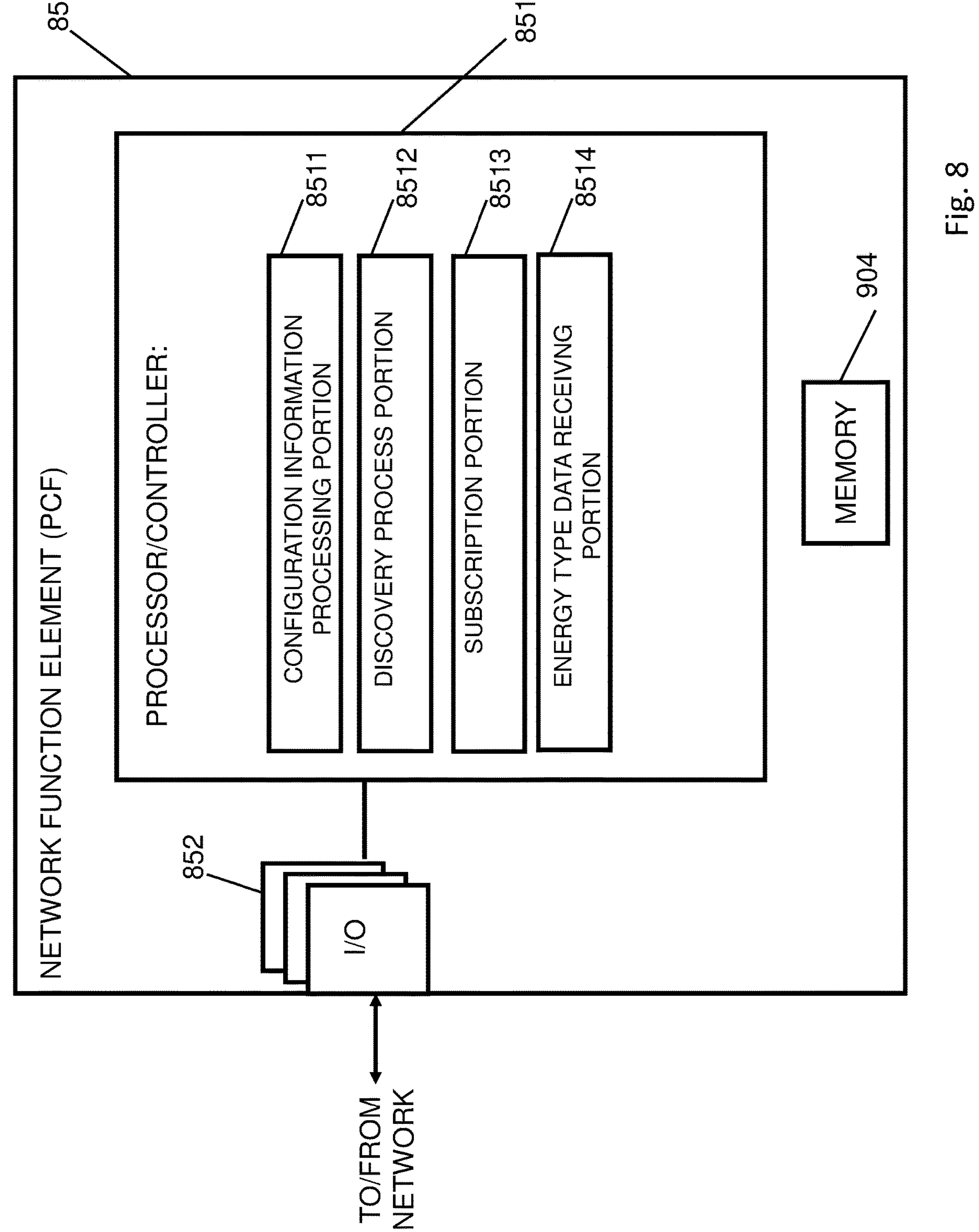
FIG. 8 shows a diagram of a communication network control element, such as a PCF, according to some examples of embodiments.

FIG. 8 shows a diagram of a communication network control element or communication network control function, such as a PCF 85, which conducts a control procedure according to some examples of the embodiments, as described in connection with FIGS. 3 and 4. It is to be noted that the network element or function such as the PCF 85 may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The PCF 85 shown in FIG. 8 may include a processing circuitry, a processing function, a control unit or a processor 851, such as a CPU or the like, which is suitable for executing instructions given by programs or the like related to the control procedure. The processor 851 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 852 denotes input/output (I/O) units or functions (interfaces) connected to the processor or processing function 851. The I/O units 852 may be used for communicating with network elements or network functions, such as the OAM entity 100, or the NEF 70. The I/O units 852 may be combined units including communication equipment towards several entities, or may include a distributed structure with a plurality of different interfaces for different entities. Reference sign 854 denotes a memory usable, for example, for storing data and programs to be executed by the processor or processing function 851 and/or as a working storage of the processor or processing function 851. It is to be noted that the memory 854 may be implemented by using one or more memory portions of the same or different type of memory.

The processor or processing function 851 is configured to execute processing related to the above described control procedure. In particular, the processor or processing circuitry or function 851 includes one or more of the following sub-portions. Sub-portion 8511 is a processing portion which is usable as a portion for processing configuration information. The portion 8511 may be configured to perform processing according to S610 of FIG. 6. Furthermore, the processor or processing circuitry or function 851 may include a sub-portion 8512 usable as a portion for conducting a discovery process. The portion 8512 may be configured to perform a processing according to S620 of FIG. 6. In addition, the processor or processing circuitry or function 851 may include a sub-portion 8513 usable as a portion for conducting a subscription process. The portion 8513 may be configured to perform a processing according to S630 of FIG. 6. Furthermore, the processor or processing circuitry or function 851 may include a sub-portion 8514 usable as a portion for receiving energy type data. The portion 8514 may be configured to perform a processing according to S640 of FIG. 6.

It is to be noted that examples of embodiments are applicable to various different network configurations. The examples of embodiments shown in the above described figures, which are used as a basis for the examples of embodiments described herein, are only illustrative and are not limiting in any way. That is, additional further existing and proposed new functionalities available in a corresponding operation environment may be used in connection with examples of embodiments based on the principles defined.

According to a further example of embodiments, there is provided, for example, an apparatus for use by a communication network control element or communication network control function acting as an operation and maintenance entity of a communication network, the apparatus comprising means configured to obtain energy type data related to an energy supply of at least a part of the communication network, means configured to conduct a first mapping process of mapping the obtained energy type data to at least one network element or network function of the communication network or to at least one communication operation conducted in the communication network, and means configured to process a result of the first mapping process for conducting a report operation or network optimization operation based on the energy type data.

Furthermore, according to some other examples of embodiments, the above defined apparatus may further comprise means for conducting at least one of the processing defined in the above described methods, for example a method according to that described in connection with FIG. 5.

According to a further example of embodiments, there is provided, for example, an apparatus for use by a communication network control element or communication network control function of a communication network, the apparatus comprising means configured to process configuration information for subscribing on a notification on events related to energy type data from an application function connected to the communication network, means configured to conduct a discovery process for energy type data related to an energy supply of at least a part of the communication network by using an event identification related to energy type data, the event identification being set in the configuration for subscribing, means configured to subscribe to an application function providing energy type data by using the event identification, and means configured to receive energy type data related to an energy supply of at least a part of the communication network.

Furthermore, according to some other examples of embodiments, the above defined apparatus may further comprise means for conducting at least one of the processing defined in the above described methods, for example a method according to that described in connection with FIG. 6.

According to a further example of embodiments, there is provided, for example, an apparatus for use by a communication network control element or communication network control function of a communication network acting as an entity for implementing an energy saving concept in the communication network, the apparatus comprising means configured to receive an energy saving strategy depending on an available energy type or mixture of energy types, means configured to process the energy saving strategy for determining a control procedure related to energy consumption in the communication network, wherein the control procedure related to energy consumption in the communication network is based on a determination of an available energy amount of a specific energy type indicated in the energy saving strategy.

According to a further example of embodiments, there is provided, for example, an apparatus for use by a communication network control element or communication network control function of a communication network acting as a network analytics entity, the apparatus comprising means configured to obtain domain specific energy consumption information in at least a part of the communication network, means configured to receive mapping data including a mapping of location information related to a network element or network function to an energy service area or point of supply of an energy type or a mixture of energy types, means configured to derive, on the basis of the domain specific energy consumption information and the mapping data, energy mixture information related to the part of the communication network or to a communication connection in the communication network, and means configured to exposure the energy mixture information to an internal network element or network function, or an external party connected to the communication network.

According to a further example of embodiments, there is provided, for example, a non-transitory computer readable medium comprising program instructions for causing an apparatus to perform, when used in a communication network control element or communication network control function acting as an operation and maintenance entity of a communication network, a processing comprising obtaining energy type data related to an energy supply of at least a part of the communication network, conducting a first mapping process of mapping the obtained energy type data to at least one network element or network function of the communication network or to at least one communication operation conducted in the communication network, and processing a result of the first mapping process for conducting a report operation or network optimization operation based on the energy type data.

According to a further example of embodiments, there is provided, for example, a non-transitory computer readable medium comprising program instructions for causing an apparatus to perform, when used in in a communication network control element or communication network control function of a communication network, a processing comprising processing configuration information for subscribing on a notification on events related to energy type data from an application function connected to the communication network, conducting a discovery process for energy type data related to an energy supply of at least a part of the communication network by using an event identification related to energy type data, the event identification being set in the configuration for subscribing, subscribing to an application function providing energy type data by using the event identification, and receiving energy type data related to an energy supply of at least a part of the communication network.

According to a further example of embodiments, there is provided, for example, a non-transitory computer readable medium comprising program instructions for causing an apparatus to perform, when used in a communication network control element or communication network control function of a communication network acting as an entity for implementing an energy saving concept in the communication network, a processing comprising receiving an energy saving strategy depending on an available energy type or mixture of energy types, processing the energy saving strategy for determining a control procedure related to energy consumption in the communication network, wherein the control procedure related to energy consumption in the communication network is based on a determination of an available energy amount of a specific energy type indicated in the energy saving strategy.

According to a further example of embodiments, there is provided, for example, a non-transitory computer readable medium comprising program instructions for causing an apparatus to perform, when used in a communication network control element or communication network control function of a communication network acting as a network analytics entity, a processing comprising obtaining domain specific energy consumption information in at least a part of the communication network, receiving mapping data including a mapping of location information related to a network element or network function to an energy service area or point of supply of an energy type or a mixture of energy types, deriving, on the basis of the domain specific energy consumption information and the mapping data, energy mixture information related to the part of the communication network or to a communication connection in the communication network, and exposing the energy mixture information to an internal network element or network function, or an external party connected to the communication network.

It should be appreciated that

- an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines;
- embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler;
- implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).
- embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described;
- an apparatus may be implemented by a semiconductor chip, a chipset, or a (hardware) module including such chip or chipset;
- embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components;
- embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

The invention claimed is:

1. An apparatus for use by a communication network control element or communication network control function acting as an operation and maintenance entity of a communication network, the apparatus comprising:
- at least one processing circuitry, and
- at least one memory for storing instructions that, when executed by the at least one processing circuitry, cause the apparatus at least:
- to obtain energy type data related to an energy supply of at least a part of the communication network,
- to conduct a first mapping process of mapping the obtained energy type data to at least one network element or network function of the communication network or to at least one communication operation conducted in the communication network, and
- to process a result of the first mapping process for conducting a report operation or network optimization operation based on the energy type data, wherein the instructions, when executed by the at least one processing circuitry, further cause the apparatus to deduce a time of supply of each energy type for the energy supply to the network element or network function.

2. The apparatus according to claim 1, wherein the energy type data related to an energy supply of at least a part of the communication network comprises at least one of:

information specifying an energy type according to an energy source used for the energy supply, information specifying a characteristic of an energy source used for the energy supply, information indicating a respective partition of an energy type of a specific characteristic, information indicating a mixture of different energy types used for the energy supply and a respective partition of the different energy types, information indicating an energy service area of an energy type powered by the energy supply, information indicating a point of supply of an energy type used for the energy supply, information indicating a duration of availability of an energy supply by an energy type, information indicating a price for an energy supply by an energy type, or information indicating an available amount of an energy type.

3. The apparatus according to claim 1, wherein the instructions, when executed by the at least one processing circuitry, further cause the apparatus to obtain the energy type data from at least one application function associated to an energy supplier for at least a part of the communication network.

4. The apparatus according to claim 1, wherein the instructions, when executed by the at least one processing circuitry, further cause the apparatus to obtain the energy type data by using a specified event identification indicating a capability of providing the energy type data.

5. The apparatus according to claim 1, wherein the instructions, when executed by the at least one processing circuitry, further cause the apparatus to derive changes in at least one of an availability of at least one energy type, or an energy supplier providing an energy type.

6. The apparatus according to claim 1, wherein the instructions, when executed by the at least one processing circuitry, further cause the apparatus in the first mapping process, to map location information related to a network element or network function to an energy service area or point of supply of an energy type indicated in the energy type data, and to deduce an energy type or a mixture of energy types used for the energy supply to a network element or network function.

7. The apparatus according to claim 1, wherein the instructions, when executed by the at least one processing circuitry, further cause the apparatus when processing the result of the first mapping process for conducting a report operation, to transmit the result of the first mapping to at least one of a network element or network function of the communication network, or an external party connected to the communication network.

8. The apparatus according to claim 1, wherein the instructions, when executed by the at least one processing circuitry, further cause the apparatus when processing the result of the first mapping process for conducting a report operation, to conduct a second mapping process for mapping the energy type data to energy consumption measurement data related to at least a part of the communication network, and to transmit a result of the second mapping process to an a network element or network function for processing the result.

9. The apparatus according to claim 8, wherein the network element or network function processing the result comprises at least one of an internal network element or network function, or an external party connected to the communication network.

10. The apparatus according to claim 1, wherein the part of the communication network comprises one of the complete communication network, a specific part of the communication network, a single network element or network function of the communication network, a specific network slice of the communication network, and a specific communication connection between two end points in the communication network.

11. The apparatus according to claim 1, wherein the instructions, when executed by the at least one processing circuitry, further cause the apparatus when processing the result of the first mapping process for conducting an optimization operation, to derive a quality of service setting depending on an available energy type or mixture of energy types, and to provide a rule reflecting the quality of service setting to the communication network.

12. The apparatus according to claim 11, wherein the instructions, when executed by the at least one processing circuitry, further cause the apparatus to configure a switching rule for automatically switching between different quality of service settings for a respective availability of energy type or mixture of energy types.

13. The apparatus according to claim 11, wherein the quality of service setting defines to increase an uplink and downlink data rate of a communication connection depending on an available energy type, to decrease an uplink/downlink data rate of a communication connection depending on an available energy type, and to maintain a guaranteed data rate regardless of an available energy type.

14. The apparatus according to claim 1, wherein the instructions, when executed by the at least one processing circuitry, further cause the apparatus when processing the result of the first mapping process for conducting an optimization operation, to derive an energy saving strategy depending on an available energy type or mixture of energy types, and to provide the energy saving strategy to a network element or network function of the communication network.

15. An apparatus for use by a communication network control element or communication network control function of a communication network acting as an entity for implementing an energy saving concept in the communication network, the apparatus comprising:

at least one processing circuitry, and at least one memory for storing instructions that, when executed by the at least one processing circuitry, cause the apparatus at least:

to receive an energy saving strategy depending on an available energy type or mixture of energy types, to process the energy saving strategy for determining a control procedure related to energy consumption in the communication network, wherein the control procedure related to energy consumption in the communication network is based on a determination of an available energy amount of a specific energy type indicated in the energy saving strategy, wherein the apparatus is implemented in a self-organizing network element or self-organizing network function of the communication network.

* * * * *